United States Patent

Oughton, Jr. et al.

[11] Patent Number: 5,680,301
[45] Date of Patent: Oct. 21, 1997

[54] SERIES/PARALLEL RESONANT CONVERTER

[75] Inventors: George W. Oughton, Jr.; Steven Widener, both of Raleigh, N.C.

[73] Assignee: Exide Electronics Corporation, Raleigh, N.C.

[21] Appl. No.: 939,441

[22] Filed: Sep. 2, 1992

[51] Int. Cl.⁶ .................................................. H02M 7/00
[52] U.S. Cl. .................................................. 363/132
[58] Field of Search ........................... 363/17, 24–26, 363/97, 98, 132, 137

[56] References Cited

U.S. PATENT DOCUMENTS

| | | | |
|---|---|---|---|
| 3,390,275 | 6/1968 | Baker | 307/64 |
| 4,078,247 | 3/1978 | Albrecht | 363/96 |
| 4,124,885 | 11/1978 | Nordby | 363/98 |
| 4,460,949 | 7/1984 | Steigerwald | 363/28 |
| 4,477,868 | 10/1984 | Steigerwald | 363/28 |
| 4,639,849 | 1/1987 | Noworolski et al. | 363/132 |
| 4,691,273 | 9/1987 | Kuwata et al. | 363/132 |
| 4,758,940 | 7/1988 | Steigerwald | 363/98 |
| 4,785,387 | 11/1988 | Lee et al. | 363/21 |
| 4,814,962 | 3/1989 | Magalhaes et al. | 363/16 |
| 4,860,184 | 8/1989 | Tabisz et al. | 363/98 |
| 4,992,919 | 2/1991 | Lee et al. | 363/17 |
| 5,001,621 | 3/1991 | Egawa | 363/132 |
| 5,014,182 | 5/1991 | Cohen | 363/132 |
| 5,057,698 | 10/1991 | Widener et al. | 363/98 |
| 5,073,849 | 12/1991 | Morris | 363/21 |
| 5,091,069 | 2/1992 | Hendrickson et al. | 204/176 |
| 5,157,593 | 10/1992 | Jain | 363/98 |

FOREIGN PATENT DOCUMENTS

| | | | |
|---|---|---|---|
| 0937294 | 9/1963 | United Kingdom | 363/132 |
| 2043370 | 10/1980 | United Kingdom | 363/132 |
| 2085243 | 4/1982 | United Kingdom | 363/98 |

*Primary Examiner*—Thomas M. Dougherty
*Attorney, Agent, or Firm*—Woodcock Washburn Kurtz Mackiewicz & Norris LLP

[57] ABSTRACT

A series/parallel resonant converter includes a resonant control circuit 1 that outputs a pair of alternately high gate drive signals $G_1$, $G_2$; switches in the form of isolated gate bipolar transistors (IGBTs) $Q_1$, $Q_2$; diodes $D_1$, $D_2$; a pair of resonant capacitors $C_R$; a series resonant inductor $L_{RS}$; a load 2; a zero current detector 4; a bus 6, 6'; and a parallel resonant inductor $L_{RP}$ in parallel with the load. The input line current and voltage are converted into an alternating current $I_{LOAD}$ and voltage $V_{LOAD}$ for driving the load 2. The load 2 may include a transformer $T_1$, half bridge rectifier, capacitor, and PWM inverter.

5 Claims, 9 Drawing Sheets

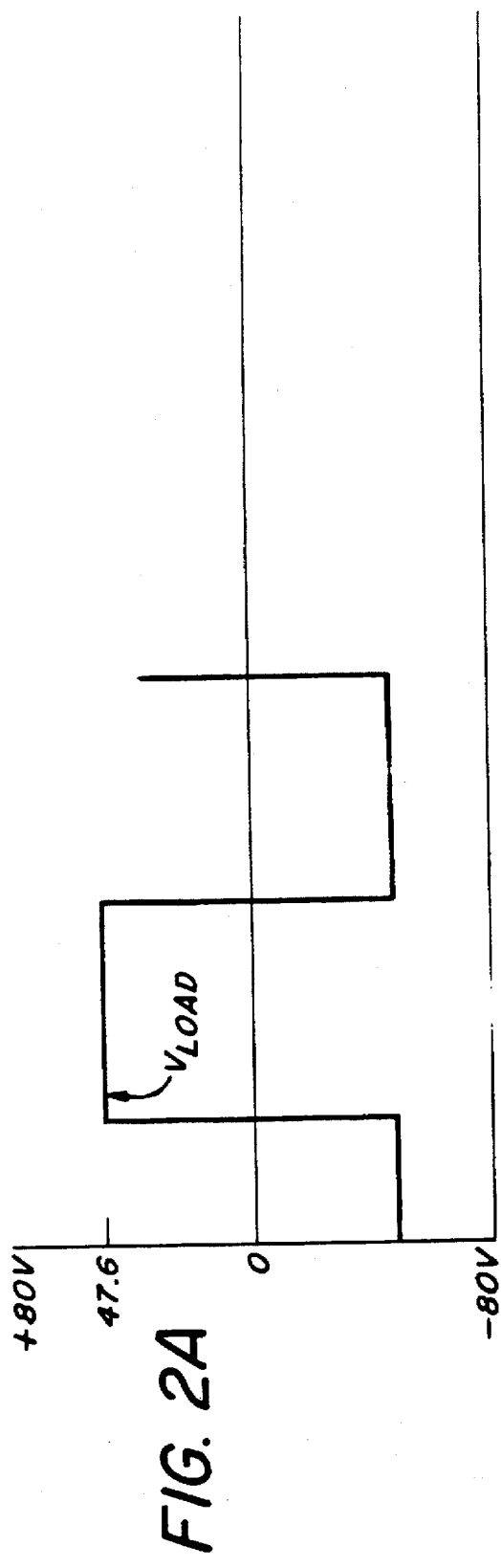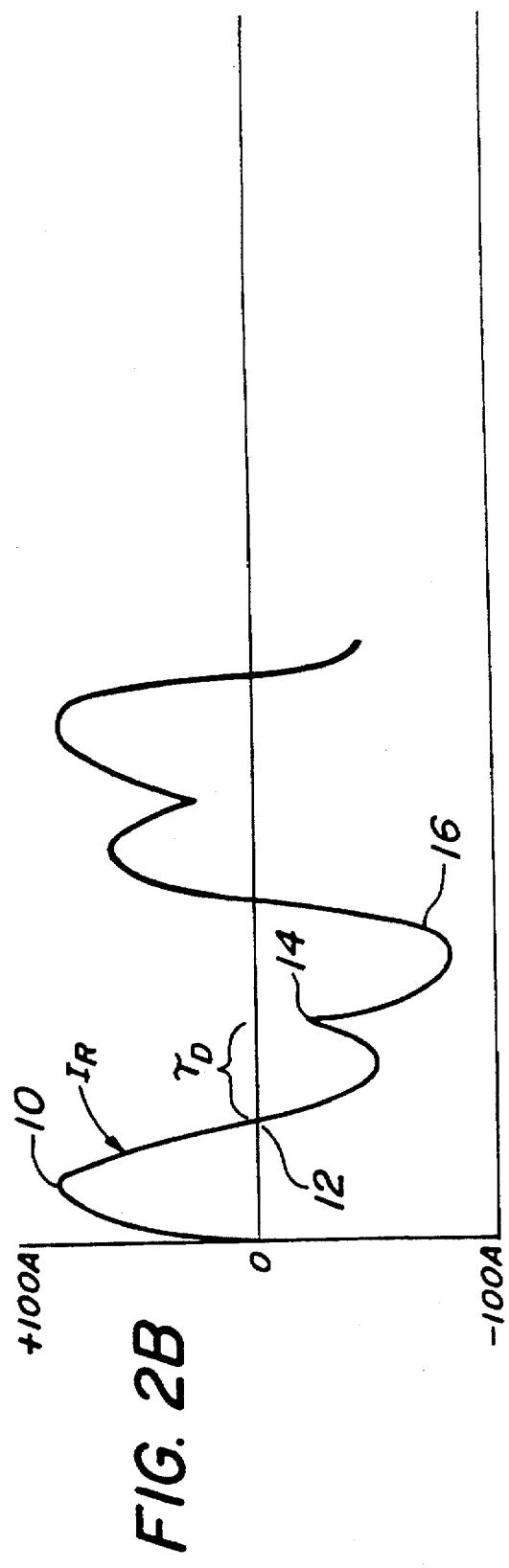

000000
SERIES/PARALLEL RESONANT CONVERTER

FIELD OF THE INVENTION

The present invention generally relates to power supplies and resonant converters used in power supplies. More particularly, the present invention relates to electrical circuits of the type found in resonant converters for converting a DC bus voltage into an AC current for driving a load.

BACKGROUND OF THE INVENTION

Traditional half bridge series resonant converters (HBSRCs) are limited to supply voltages (bus voltages) no less than two times the load voltage ($2V_{LOAD}$). However, a rectified single phase 120 $V_{RMS}$ source varies from 0 to 170 V peak. An HBSRC with a load voltage of about 50 V ceases to effectively process power when the input voltage goes below 100 V. As discussed below, power conversion efficiency and input current drops during the valley portion of the rectified single phase bus voltage. This prevents the achievement of high power factors and low input current total harmonic distortion (THD). The traditional solution to this problem is to add a boost converter (commonly referred to as a "power factor corrector" circuit) in front of the main converter. However, this adds cost and complexity and reduces reliability (MTBF).

FIG. 1 schematically depicts a prior art half bridge series resonant converter. This prior art circuit converts the input line alternating current and voltage ($I_{LINE}$, $V_{LINE}$) into alternating output current and voltage of different magnitudes. The input line current and voltage are rectified by the circuit of FIG. 1 into a full-wave DC current $I_{DC\ IN}$ and bus voltage $V_{BUS}$. The bus voltage is filtered with a large filter capacitor $C_{IN}$. The HBSRC also includes a resonant control circuit 1 that outputs a pair of alternately high gate drive signals $G_1$, $G_2$; switches in the form of isolated gate bipolar transistors (IGBTs) $Q_1$, $Q_2$; diodes $D_1$, $D_2$; a pair of resonant capacitors $C_R$; a series resonant inductor $L_{RS}$; a load 2; a zero current detector 4; and a bus 6, 6'. Although not shown, prior art circuits typically also include power factor correction circuitry. The portion of the circuit depicted in FIG. 1 converts the input line current and voltage into an alternating current $I_{LOAD}$ and voltage $V_{LOAD}$ for driving the load 2. (The term $V_{LOAD}$ is used in this specification to mean both the actual voltage drop across the load and the nominal, or characteristic, voltage of the load. The actual voltage drop can be less than or equal to the nominal voltage drop. The intended meaning for any particular use of the term will be apparent from the context.)

As shown in FIG. 1A, the load 2 typically comprises a transformer $T_1$, half bridge rectifier, capacitor, and PWM inverter. It is well known in the art that the voltage reflected to the primary winding of the transformer $T_1$ alternates between substantially constant positive and negative magnitudes.

FIG. 2 depicts exemplary load voltage $V_{LOAD}$ and resonant current $I_R$ waveforms produced in a half bridge series resonant converter operating at about 70 Khz with a bus voltage $V_{BUS}$ of 120 V and an alternating load voltage $V_{LOAD}$ of 47.6 V. The waveforms depicted in FIGS. 2-4 and the following description of the operation of the HBSRC ignore the presence of the filter capacitor $C_{IN}$ and power factor correction circuitry, since, as discussed below, a goal of the present invention is to avoid the use of these elements.

Assume that initially the voltage $V_{CR}$ at a node between the two resonant capacitors $C_R$ is zero and the gate signals $G_1$, $G_2$ are low. When gate signal $G_1$ is driven high by the control circuit 1, current from the high side of the bus 6 flows through transistor $Q_1$, to the left through the load 2 (i.e., through the primary winding of the transformer $T_1$), through the series resonant inductor $L_{RS}$, and into the resonant capacitors $C_R$. When $V_{BUS}$ equals 120 V, the resonant current $I_R$ reaches its peak when the voltage $V_{CR}$ is approximately 70 V and the voltage across the resonant inductor $L_{RS}$ is approximately zero. The resonant inductor $L_{RS}$ causes the current $I_R$ to continue to flow into the resonant capacitors $C_R$ until the voltage $V_{CR}$ reaches a peak of approximately 140 V relative to the low side of the bus 6' and 50 V relative to the high side of the bus 6. Reference numeral 10 in FIG. 2 designates the time in the cycle at which $I_R$ is at its peak and reference numeral 12 designates the time at which $I_R$ is zero; the zero crossing time 12 is also the time at which the voltage $V_{CR}$ is at its peak of approximately 140 V. (The circuit operation is like that of a child's swing in the sense that the current $I_R$ is analogous to the velocity of the swing and the voltage $V_{CR}-V_{BUS}$ is analogous to the gravitational force acting on the swing.)

At the zero crossing time 12, the control circuit 1 drives gate drive signal $G_1$ low. At this time, the charge stored in the capacitors $C_R$ "rings back" to the right through the series resonant inductor $L_{RS}$, through the load 2, and back up through diode $D_1$ to the high side of the bus 6. The current flows in the negative direction (to the right through the load 2) during the period of time designated $\tau_D$ in FIG. 2, reaching a negative peak and then decreasing toward zero. $\tau_D$ is the dead time during which both gate drive signals $G_1$, $G_2$ are low and thus both transistors $Q_1$, $Q_2$ are off. After this dead time delay, at the time designated 14 in FIG. 2, the control circuit 1 drives gate drive signal $G_2$ high (giving the swing a push on its upward arc) and the current $I_R$ stops flowing up through diode $D_1$ and instead flows down through transistor $Q_2$ ($Q_2$ picks up the current $I_R$). As shown in FIG. 2, the current (upward velocity of the swing) dramatically increases since the difference between $V_{CR}$ and the lower half of the bus 6' is larger than the difference between $V_{CR}$ and the top half of the bus 6. The current $I_R$ continues to flow in this manner during the interval designated 16 in FIG. 2. Then, when the current reaches zero again, the gate drive signal $G_2$ is driven low and the current rings back from the lower portion of the bus 6' up through diode $D_2$ and to the left through the load 2. This swing-back current is allowed to flow freely for the period $\tau_D$ until gate drive signal $G_1$ is driven high and the process continues as shown in FIG. 2.

FIG. 3 illustrates how $V_{LOAD}$ and $I_R$ change when the operating frequency is reduced to 30 KHz. In particular, it shows how $I_R$ and $V_{LOAD}$ become distorted as the operating frequency is reduced (note that during long intervals $I_R$ is zero and $V_{LOAD}$ dips to a rest level).

FIGS. 4A and 4B illustrate how $V_{LOAD}$ and IR change when the operating frequency is reduced to 30 KHz and the bus voltage $V_{BUS}$ drops to 80 volts, which occurs four times during each cycle of the input voltage $V_{IN}$. As shown, when the bus voltage $V_{BUS}$ drops to less than twice the load voltage $V_{LOAD}$ of 47.6 V (e.g., $V_{BUS}$=80 V), the current $I_R$ drops to and stays at approximately zero. Thus, as the bus voltage $V_{BUS}$ changes during its normal half-sinewave pattern, the resonant current $I_R$ is substantially distorted. This is illustrated by FIG. 4C, which depicts many cycles of $I_R$ and a half-cycle of $V_{BUS}$. FIG. 4C clearly shows the distortion of $I_R$ in the "valley area" where $V_{BUS}$ drops below $2V_{LOAD}$ (95.2 V in the present example). FIG. 4C also shows that, once $V_{BUS}$ rises above $2V_{LOAD}$, it takes little time (a few cycles of $I_R$) for $I_R$ to "build up" to its normal operating level; there is also a "coast down" period after $V_{BUS}$ drops below $2V_{LOAD}$. (The improvement provided by the present invention can be seen by contrasting FIG. 4C with FIG. 7.)

Accordingly, a primary goal of the present invention is to provide a resonant converter that can more effectively process power with lower supply/load voltage ratios than the prior art HBSRC. Additional goals include providing a resonant converter that achieves effective power conversion in the valley area of the rectified line voltage, low line current total harmonic distortion (THD) (e.g., below 10%) and high power factor (e.g., $\geq 0.98$) without the addition of a power factor correction boost converter and/or a large filter capacitor $C_{IN}$ (such a capacitor can cause large current spikes that are detrimental to the input line). The present invention achieves these goals.

SUMMARY OF THE INVENTION

According to the present invention, an electrical circuit for converting a DC bus voltage into an AC current for driving a load comprises first and second transistors ($Q_1$, $Q_2$) connected in series such that a collector of the first transistor is connected to a first side of the bus and an emitter of the second transistor is connected to a second side of the bus; a first diode ($D_1$) connected between an emitter and the collector of the first transistor and a second diode ($D_2$) connected between the emitter and a collector of the second transistor; first and second resonant capacitors ($C_R$) connected in series such that a first terminal of the first capacitor is connected to the first side of the bus and a second terminal of the second capacitor is connected to the second side of the bus; a series resonant inductor ($L_{RS}$) comprising a first terminal connected to a node between the first and second resonant capacitors and a second terminal adapted to be connected to a first side of the load; a parallel resonant inductor ($L_{RP}$) comprising a first terminal connected to the second terminal of the series resonant inductor and a second terminal connected to a node between the first and second transistors and adapted to be connected to a second side of the load; and control circuit means for generating first and second gate drive signals ($G_1$, $G_2$) for alternately driving the first and second transistors such that an alternating load current ($I_{LOAD}$) is provided.

One preferred embodiment of the present invention further comprises zero current crossing means for detecting when a current ($I_R$) in the series resonant inductor is zero and controlling the generation of the first and second gate drive signals such that the first gate drive signal is set low when the current is zero and the second gate drive signal is set high following a controlled dead time delay ($\tau_D$) from the time the first gate drive signal was set low.

In another embodiment of the present invention, a series/parallel resonant converter for converting a first DC bus voltage of a first magnitude to a second DC voltage of a second magnitude comprises first and second switches coupled in series such that the first switch is electrically coupled to a first side of the bus and the second switch is electrically coupled to a second side of the bus; a first diode ($D_1$) coupled in parallel with the first switch and a second diode ($D_2$) coupled in parallel with the second switch; first and second resonant capacitors ($C_R$) connected in series such that a first terminal of the first capacitor is connected to the first side of the bus and a second terminal of the second capacitor is connected to the second side of the bus; a series resonant inductor ($L_{RS}$) comprising a first terminal connected to a node between the first and second resonant capacitors and a second terminal; a parallel resonant inductor ($L_{RP}$) comprising a first terminal connected to the second terminal of the series resonant inductor and a second terminal connected to a node between the first and second switches; a transformer comprising a secondary winding and a primary winding, said primary winding comprising a first terminal coupled to the second terminal of the series resonant inductor and a second terminal coupled to the second terminal of the parallel resonant inductor; a rectifier coupled to the secondary winding; and control circuit means for generating first and second gate drive signals ($G_1$, $G_2$) for alternately driving the first and second switches such that an alternating current ($I_{LOAD}$) is provided to the primary winding of the transformer. One preferred embodiment further comprises zero current crossing means for detecting when a current ($I_R$) in the series resonant inductor is zero and controlling the generation of the first and second gate drive signals such that the first gate drive signal is set low when the current is zero and the second gate drive signal is set high following a controlled dead time delay ($\tau_D$) from the time the first gate drive signal was set low.

The present invention also encompasses a resonant converter comprising a load that drops a substantially fixed voltage, inverter means for converting a DC bus voltage to an alternating current for energizing the load, and parallel inductance means for providing a substantially inductive current path around the load such that, when a voltage driving the alternating current is less than the fixed voltage, the alternating current flows through the parallel inductance means. Other features of the present invention are described below.

BRIEF DESCRIPTION OF THE DRAWINGS

FIGS. 2A and 2B depict exemplary load voltage $V_{LOAD}$ and resonant current $I_R$ waveforms produced in an HBSRC operating at about 70 KHz with a bus voltage $V_{BUS}$ of 120 V and a load voltage $V_{LOAD}$ of 47.6 V.

DETAILED DESCRIPTION OF PREFERRED EMBODIMENTS

Figure 5:
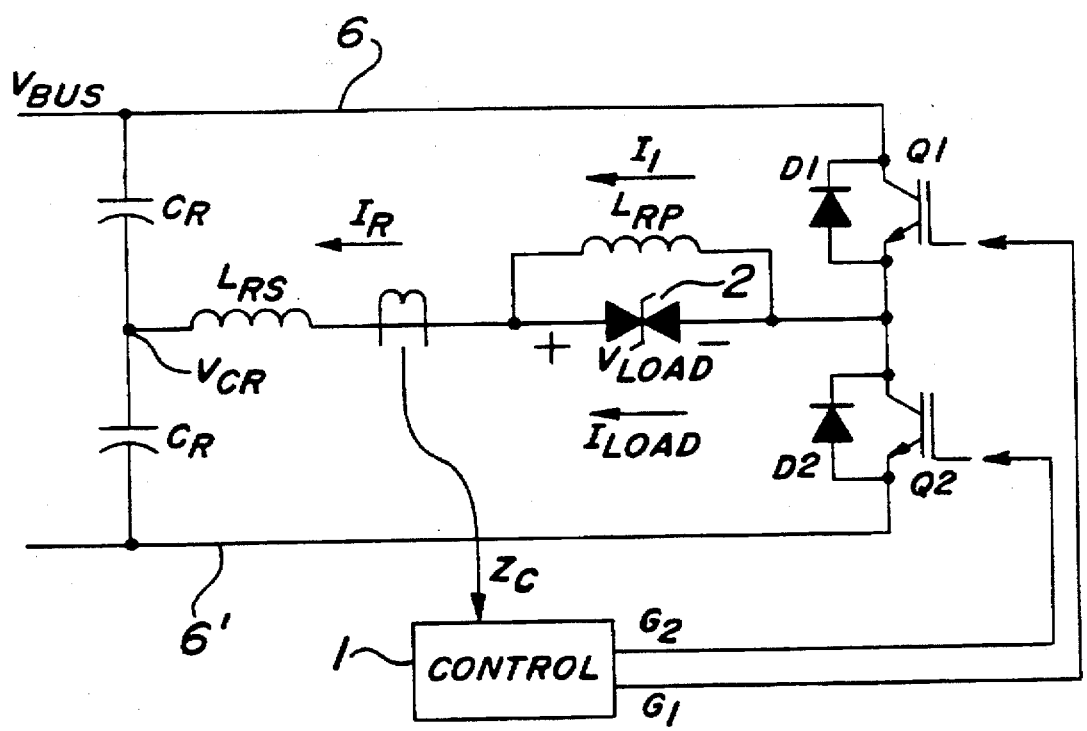
FIG. 5 depicts a series/parallel resonant converter in accordance with the present invention.

As described below, the present invention provides a true zero current crossing-based resonant control circuit that automatically adjusts the timing of the gate drive signals as the net composite resonant frequency moves from a higher series resonant frequency toward a lower parallel resonant frequency. According to the invention, an HBSRC is modified by adding a parallel resonant inductor $L_{RP}$ in parallel with the load 2, as shown in FIG. 5. The inductance of $L_{RP}$ is selected such that resonance with $C_R$ occurs at a frequency lower than the original series resonant frequency ($\frac{1}{2}\pi(2C_R L_{RS})^{1/2}$). Unlike the series/parallel, a series/parallel resonant converter in accordance with the present invention has the ability to amplify the voltage applied to the load due to resonant ring up (or swing up). The amplified voltage across $L_{RP}$ drives current into the load 2 during the periods of low bus voltage $V_{BUS}$ (i.e., during the valley of the rectified single phase line voltage). Thus, power is processed through the input voltage valley period such that near sinusoidal, low THD line current and high input power factor are realized without additional complex circuitry.

In addition, the invention employs a true zero current crossing gate control process; i.e., the timing delay $\tau_D$, which determines operating frequency, starts when the composite resonant current $I_R$ crosses zero. This process automatically tracks zero crossings as net operating frequency moves from mode "A" where series resonant current dominates through mode "B" where parallel resonant current dominates at a lower frequency with the same (or similar) $\tau_D$. In the series mode (mode A), all resonant current flows through the load while the larger voltages appear across the resonant components and a smaller square wave voltage appears across the load. In the parallel mode (mode B), a peak resonant voltage across the load is accompanied by a small portion of resonant current flowing through the load. In other words, a current $I_1$ bypasses the load and flows through the parallel resonant inductor $L_{RP}$.

As a consequence of timing $\tau_D$ and the gate drive signals $G_1$, $G_2$ with reference to the true zero current crossing points (e.g., instead of switching the transistors $Q_1$, $Q_2$ at a fixed frequency determined by an oscillator), the transitions from/to mode A when input voltage is high (above $2 \times V_{LOAD}$) to/from mode B when input voltage is low (below $2 \times V_{LOAD}$) occur naturally, without switching the transistors when the current $I_R$ is non-zero (which is known to cause switching losses). It should also be noted that the present invention may be applied in a modified full bridge series resonant converter. In addition, the parallel resonant inductor $I_{RP}$ may be replaced by an appropriate air gap in the power transformer $T_1$. (It is well known that adding an air gap or increasing an existing air gap has the same effect as adding inductance in parallel with the primary winding of the transformer; thus, an appropriately sized air gap can be used instead of $L_{RP}$.)

Figure 1:
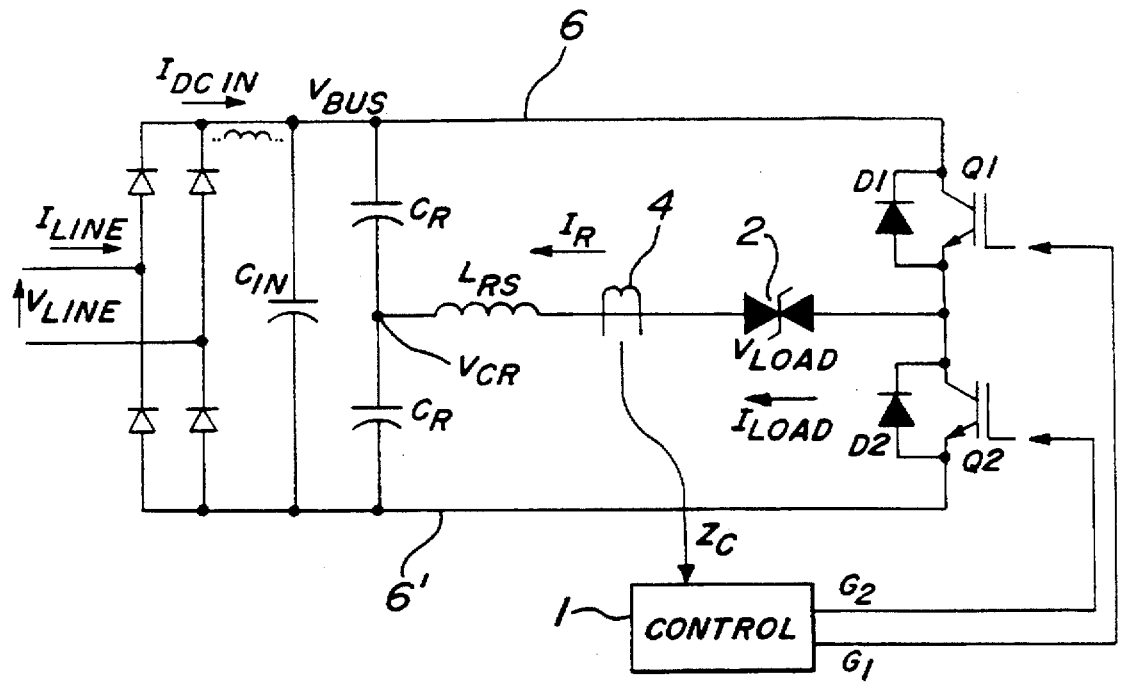
FIG. 1 depicts a prior art half bridge series resonant converter (HBSRC)
Figure 1A:
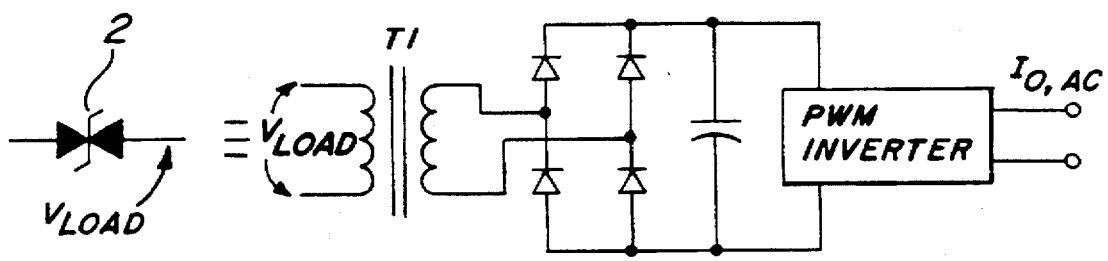
FIG. 1A depicts one example of a load used in an HBSRC of the type depicted in FIG. 1.
Figure 3A:
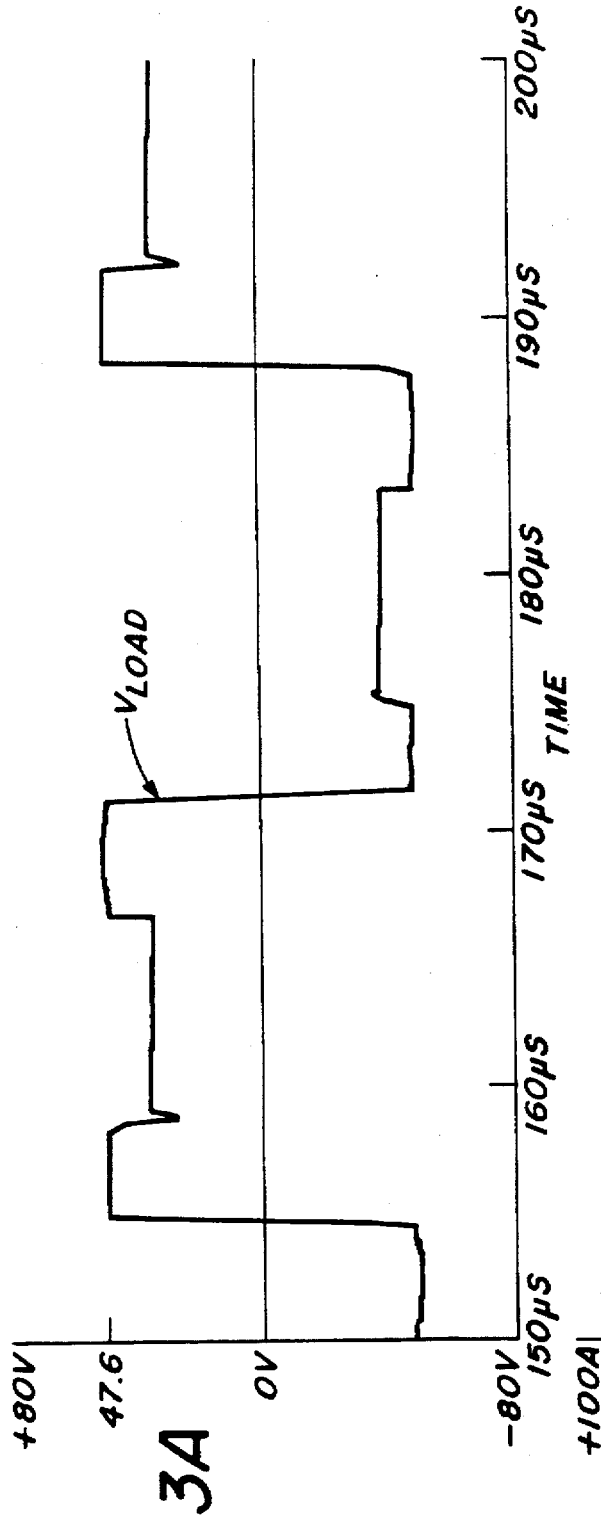
FIGS. 3A and 3B illustrate how $V_{LOAD}$ and $I_R$ change when the operating frequency is reduced to 30 KHz.
Figure 3B:
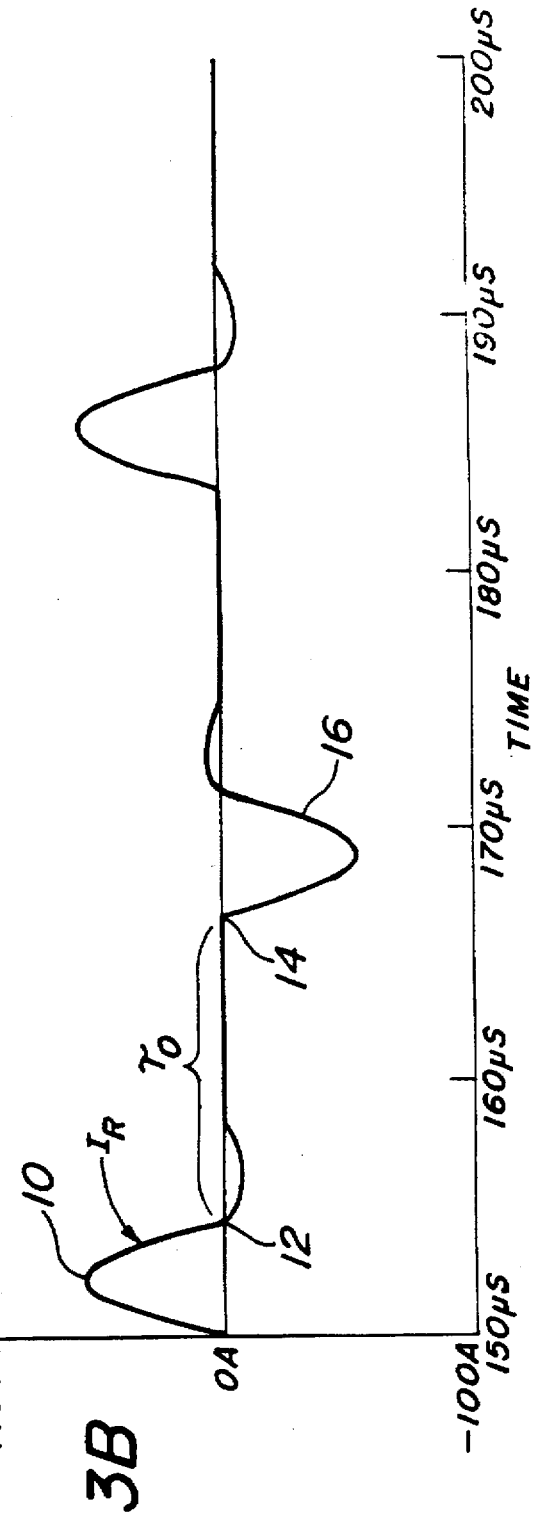

Referring now to FIG. 5, a series/parallel resonant converter in accordance with the present invention includes, in addition to the components discussed above with reference to FIG. 1, a parallel resonant inductor $L_{RP}$ connected to opposite sides of the load 2. In one example of the present invention, the component values are: $L_{RS}$=1.13 µH, $I_{RP}$=20 µH, $C_R$=0.38 µF. The control circuit 1 may include, e.g., a Unitrode UC3865 resonant control chip with additional true zero current crossing control circuitry. This additional circuitry will be apparent to those skilled in the art upon reading this specification.

Figure 4A:
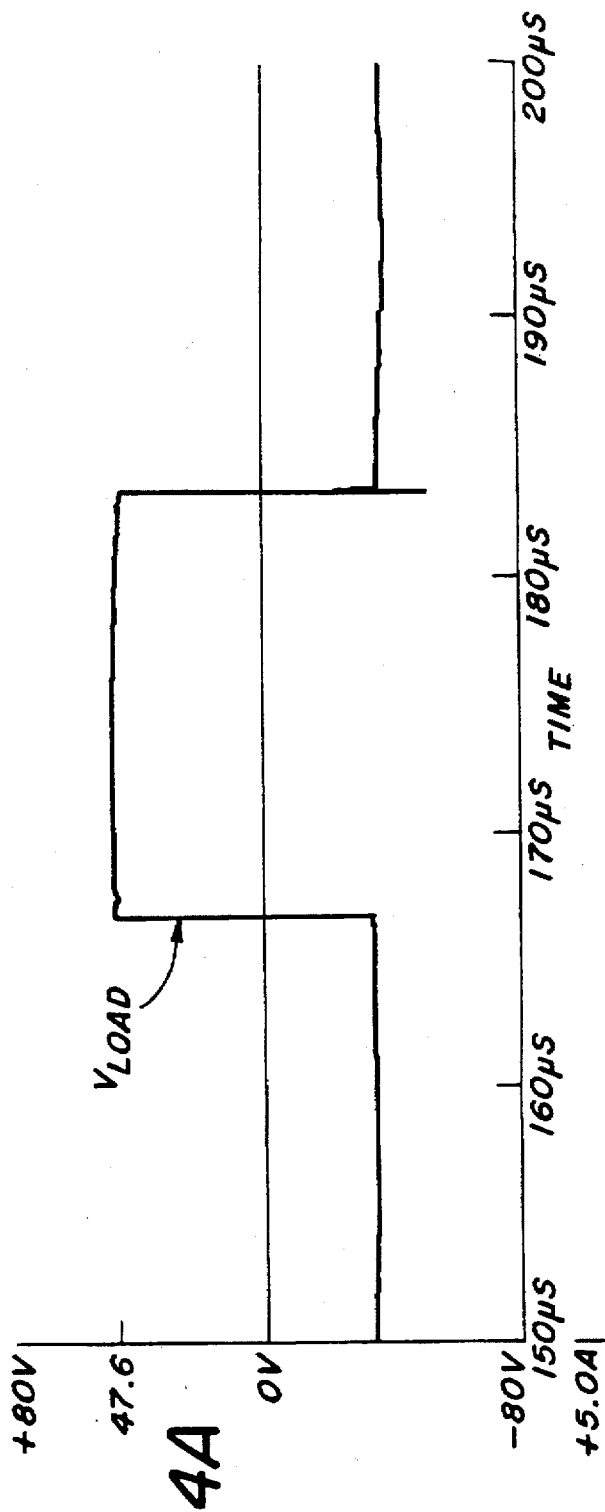
FIGS. 4A-4C illustrate how $V_{LOAD}$ and $I_R$ change when the operating frequency is reduced to 30 KHz and the bus voltage $V_{BUS}$ drops to 80 V.
Figure 4B:
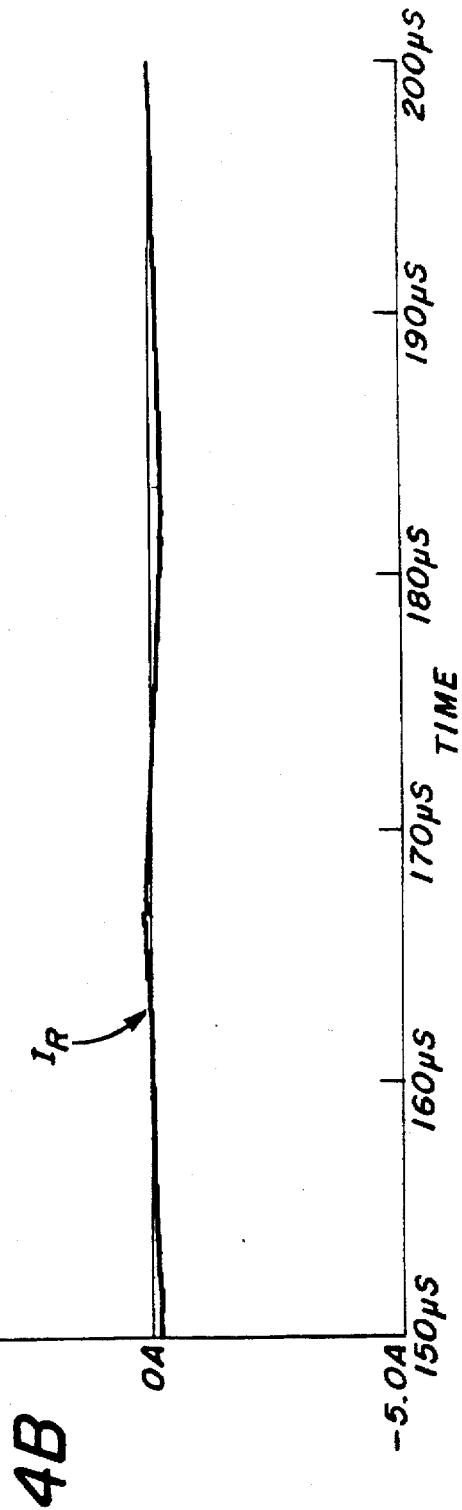
Figure 4C:
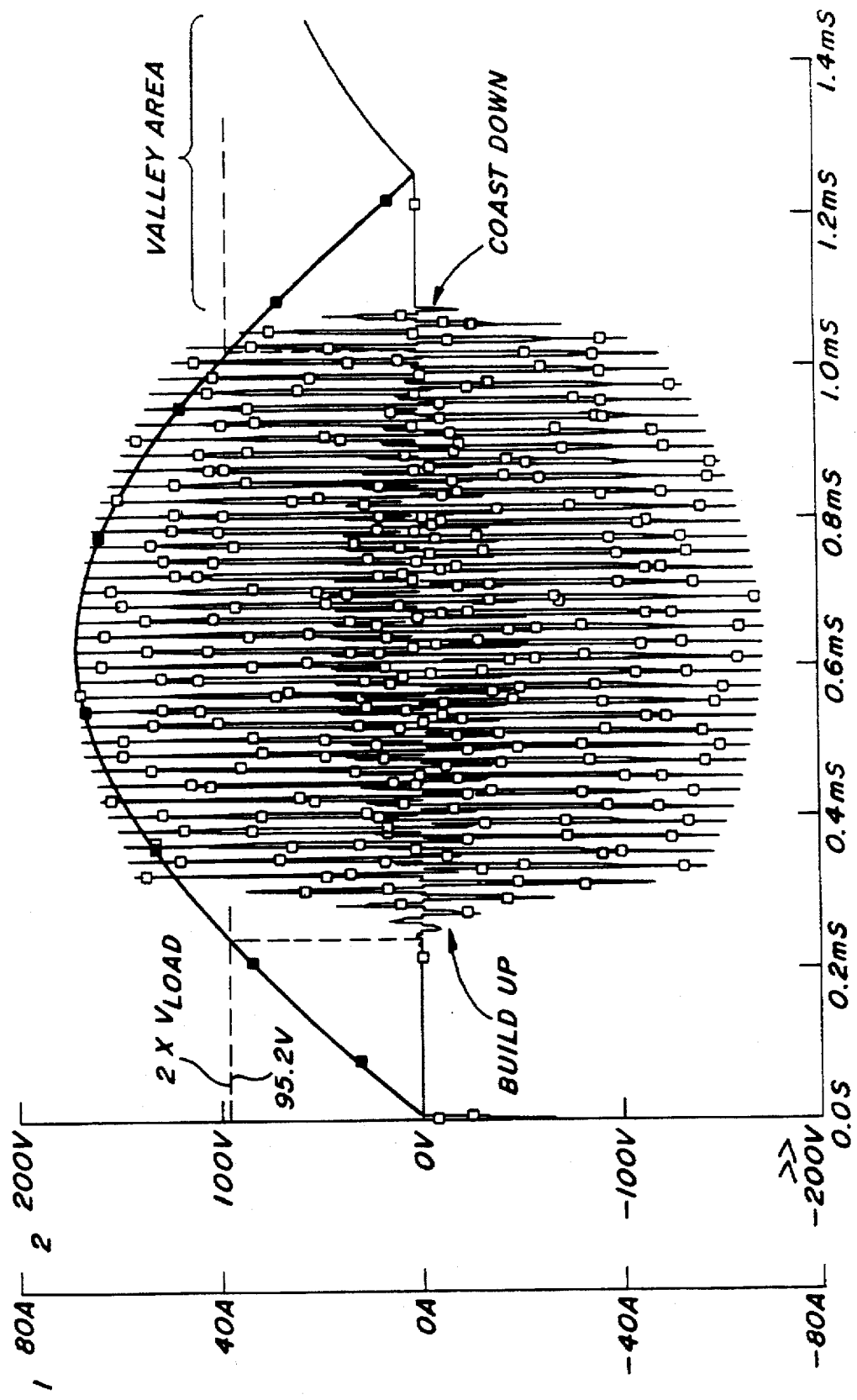
Figure 6A:
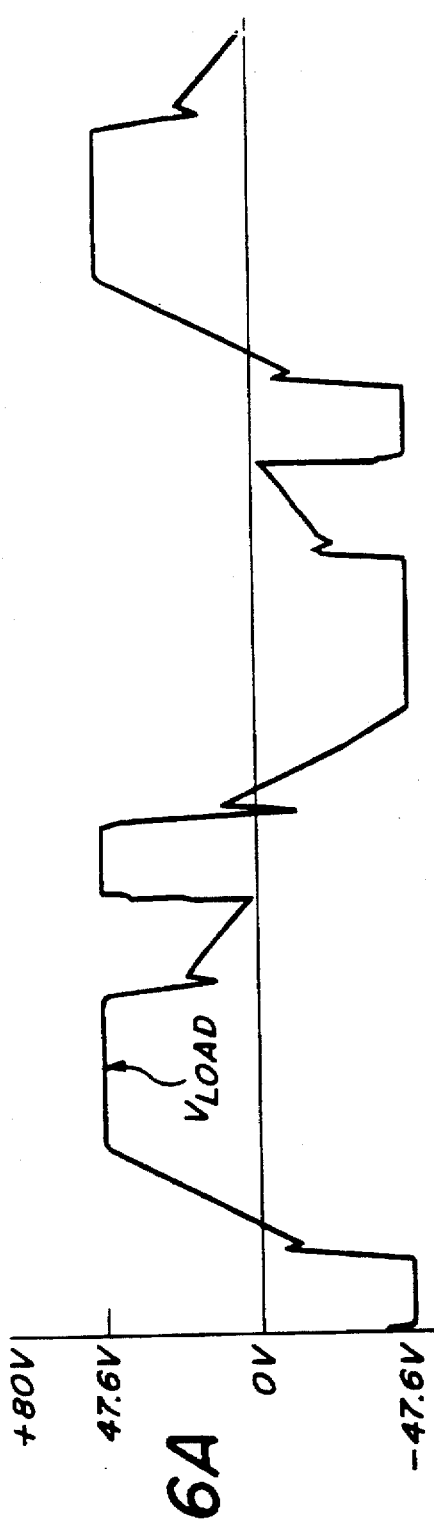
FIGS. 6A and 6B depict load voltage $V_{LOAD}$ and resonant current $I_R$ waveforms for an operating frequency of 30 KHz and bus voltage of 80 V in a series/parallel resonant converter in accordance with the present invention.
Figure 6B:
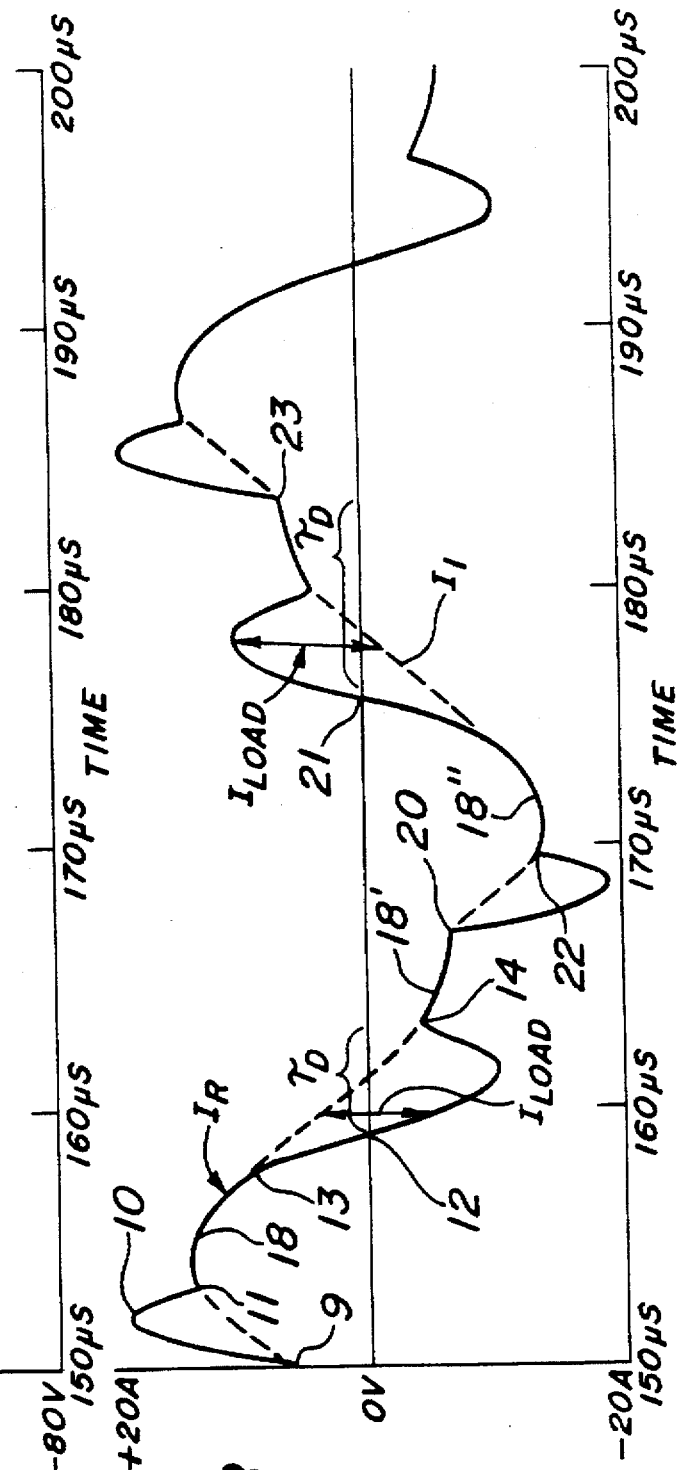

FIGS. 6A, 6B depict load voltage $V_{LOAD}$ and resonant current $I_R$ waveforms for an operating frequency of 30 KHz and bus voltage of 80 V in a series/parallel resonant converter in accordance with the present invention ($V_{LOAD}$ NOMINAL=47.6 V). These waveforms may be contrasted with the waveforms depicted in FIG. 4, which represent the performance of the prior art HBSRC under similar conditions. In the lower graph, the solid waveform represents the resonant current $I_R$ and the broken waveform represents the current $I_1$ flowing through the parallel resonant inductor $L_{RP}$; the difference between these two waveforms at any point in time is the load current $I_{LOAD}$.

Assume that just prior to time 9, $V_{CR}$ is negative (i.e., less than the voltage on the low side of the bus 6'), $G_1$ and $G_2$ are low, and current $I_R$ is charging capacitors $C_R$ through $D_2$ and $I_{RP}$. $I_{LOAD}$ is zero at this time. A cycle begins at time 9 and $G_1$ is driven high to turn on $Q_1$, which picks up $I_R$ from $D_2$. The increased driving voltage from bus 6 causes resonant current $I_R$ to increase, load current $I_{LOAD}$ to flow and $V_{LOAD}$ to rise to 47.6 V. $V_{LOAD}$ is considered negative since $I_R$ flows from right to left at this time. (Note that the reflected load is represented by a 47.6 V bidirectional zener diode and that $V_{LOAD}$ rises to 47.6 V when load current flows and reverts to the voltage across $L_{RP}$ otherwise.) $I_R$ peaks at time 10 when $V_{CR}$ reaches 80 minus 47.6 V (32.4 V). During interval 18, $I_R$ flows through $L_{RP}$ while $I_{LOAD}$ ceases and $V_{LOAD}$ drops below 47.6 V.

At time 13, $V_{CR}$ has charged to 80+47.6 V and load current again flows. At time 12, $I_R$ crosses zero, $V_{CR}$ reaches its peak voltage and the control circuit drives $G_1$ low. $Q_1$ turns off but with no effect on circuit action. $I_R$ is now flowing up through $D_1$ to the high side of the bus 6. The control circuit begins timing $\tau_D$ at the zero crossing time 12. $V_{CR}$ rings down through $D_1$ until time 20. Load current flows until time 14, at which time $I_R$ coasts only through $L_{RP}$ and $I_{LOAD}$ goes to zero.

At time 20, the control circuit finishes timing out $\tau_D$ and drives $G_2$ high, turning $Q_2$ on. At this time, $Q_2$ picks up $I_R$ from $D_1$ and initiates the complementary, negative half cycle. Current $I_R$ crosses zero again at time 21 and $\tau_D$ times out again at time 23. Time 23 marks the beginning of the next cycle.

Figure 7:
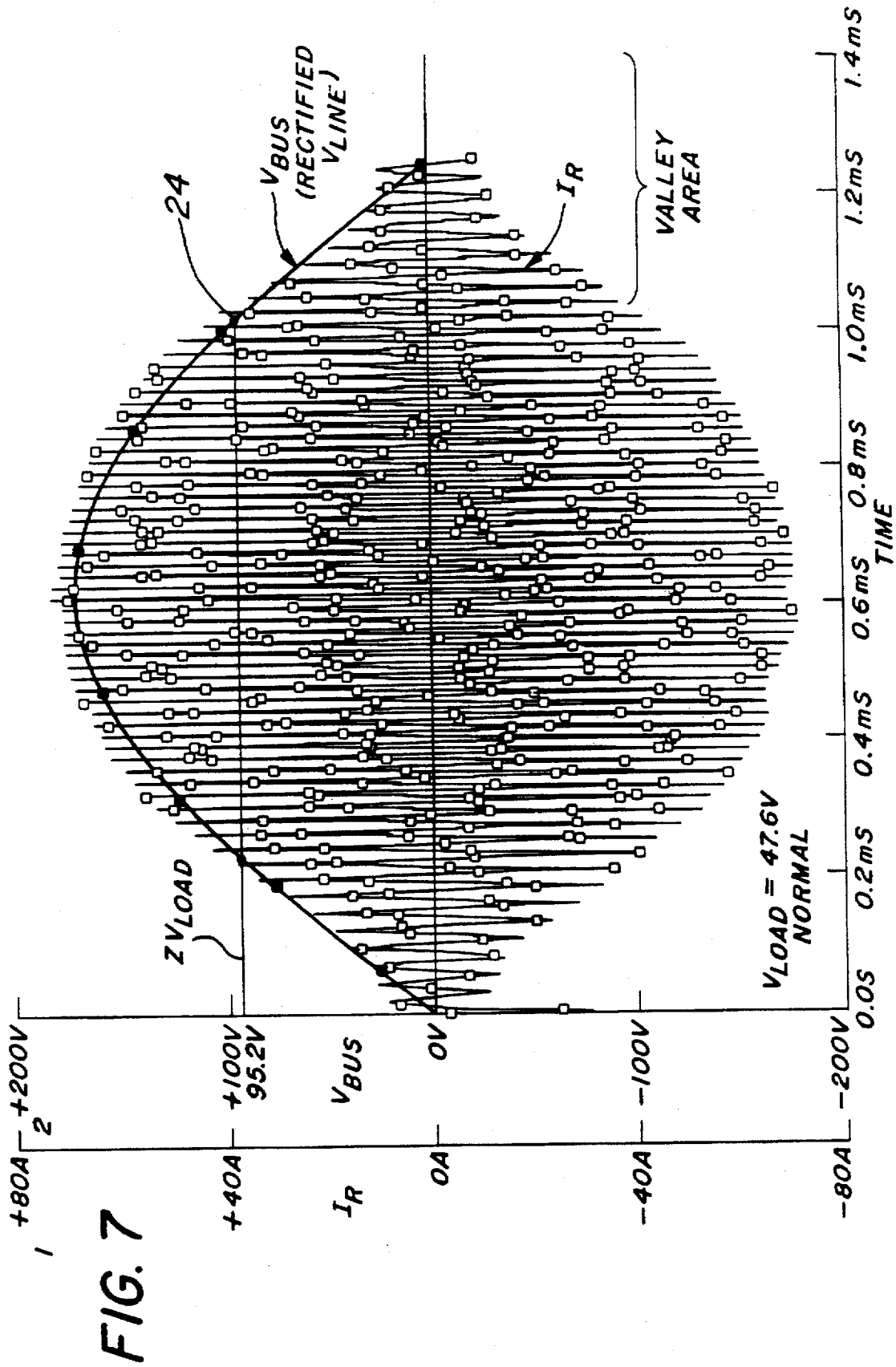
FIG. 7 illustrates how the bus voltage $V_{BUS}$ affects the resonant current $I_R$ in a series/parallel resonant converter in accordance with the present invention.
Figure 8:
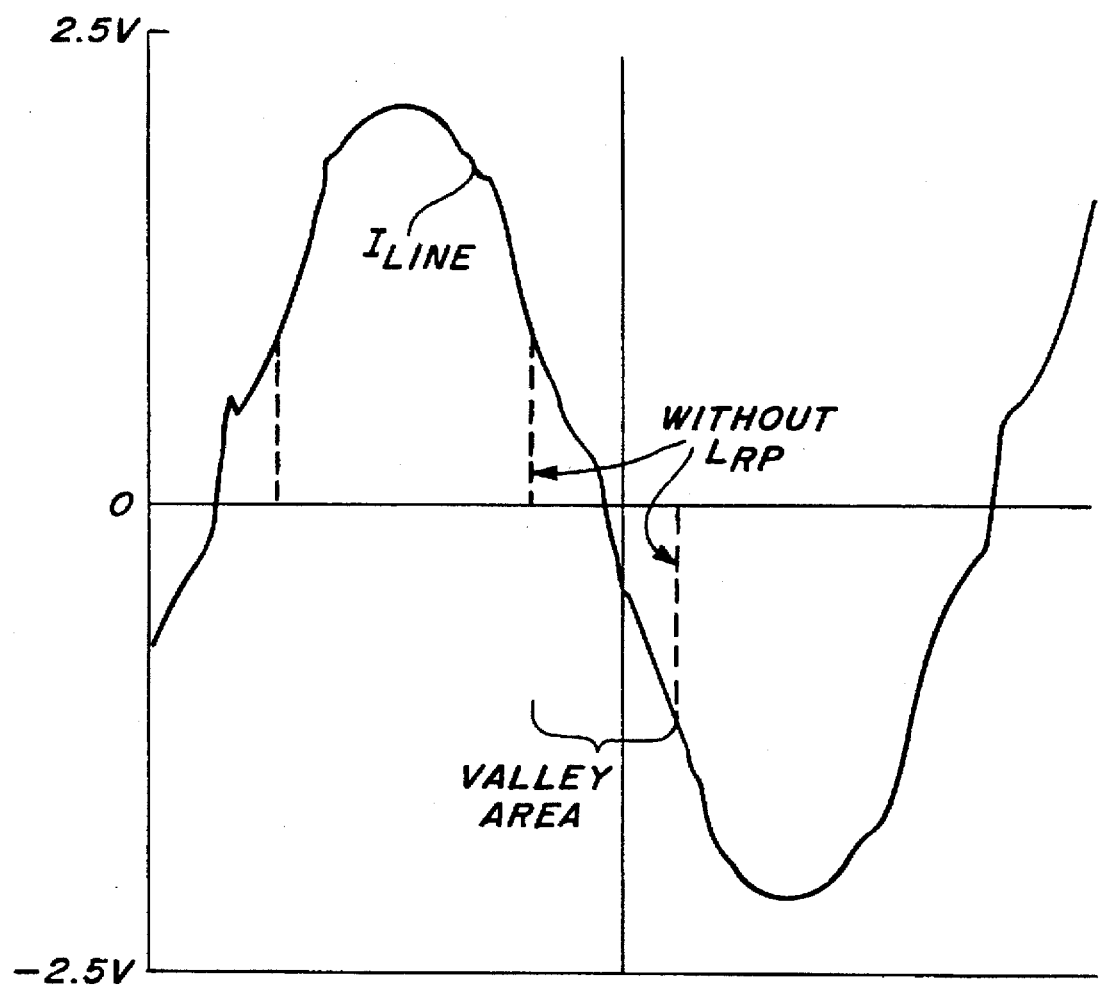
FIG. 8 illustrates how the line current $I_{LINE}$ is improved by adding a parallel resonant inductor $I_{RP}$ across the load in accordance with the present invention.

FIG. 7 illustrates how the bus voltage $V_{BUS}$ affects the resonant current $I_R$ in a series/parallel resonant converter in accordance with the present invention. As shown, the resonant current $I_R$ continues to flow as the bus voltage $V_{BUS}$ rises and falls during its half-sinewave cycle. In particular, note that, if the parallel resonant inductor $L_{RP}$ were not present, the current $I_R$ would be shut off (remain zero) whenever the bus voltage $V_{BUS}$ falls below the level represented by line 24. The improvement provided by the present invention is evident. Moreover, the line current $I_{LINE}$ remains sinusoidal, even in the "valley area" (i.e., where $V_{BUS}$ is less than $2V_{LOAD}$), as shown in FIG. 8. FIG. 8 also shows how $I_{LINE}$ drops off in the valley area when $L_{RP}$ is not used.

Finally, it should be noted that many modifications and variations of the above-described preferred embodiments are within the true scope of the present invention as described in the following claims. For example, the present invention may be carried out with a full bridge resonant converter instead of the half bridge converter described above. In addition, instead of IGBT switches $Q_1$, $Q_2$, other types of electronic switches could be employed, e.g., BJTs, FETs, and MOS-controlled thyristors (MCTs), including SCRs.

I claim:

1. An electrical circuit for converting a DC bus voltage into an AC current for driving a load, comprising:
   (a) first and second transistors ($Q_1$, $Q_2$) connected in series such that a collector of the first transistor is connected to a first side of the bus and an emitter of the second transistor is connected to a second side of the bus;

(b) a first diode ($D_1$) connected between an emitter and the collector of the first transistor and a second diode ($D_2$) connected between the emitter and a collector of the second transistor;

(c) first and second resonant capacitors ($C_R$) connected in series such that a first terminal of the first capacitor is connected to the first side of the bus and a second terminal of the second capacitor is connected to the second side of the bus;

(d) a series resonant inductor ($L_{RS}$) comprising a first terminal connected to a node between the first and second resonant capacitors and a second terminal adapted to be connected to a first side of the load;

(e) a parallel resonant inductor ($L_{RP}$) comprising a first terminal connected to the second terminal of the series resonant inductor and a second terminal connected to a node between the first and second transistors and adapted to be connected to a second side of the load; and (f) control circuit means for generating first and second gate drive signals ($G_1$, $G_2$) for alternately driving the first and second transistors such that an alternating load current ($I_{LOAD}$) is provided.

2. The electrical circuit recited in claim 1, further comprising zero current crossing means for detecting when a current ($I_R$) in the series resonant inductor is zero and controlling the generation of the first and second gate drive signals such that the first gate drive signal is set low when the current is zero and the second gate drive signal is set high following a controlled dead time delay ($\tau_D$) from the time the first gate drive signal was set low.

3. A series/parallel resonant converter for converting a first DC bus voltage of a first magnitude to a second DC voltage of a second magnitude, comprising:

(a) first and second switches coupled in series such that the first switch is electrically coupled to a first side of the bus and the second switch is electrically coupled to a second side of the bus;

(b) a first diode coupled in parallel with the first switch and a second diode coupled in parallel with the second switch;

(c) first and second resonant capacitors connected in series such that a first terminal of the first capacitor is connected to the first side of the bus and a second terminal of the second capacitor is connected to the second side of the bus;

(d) a series resonant inductor comprising a first terminal connected to a node between the first and second resonant capacitors and a second terminal;

(e) a parallel resonant inductor comprising a first terminal connected to the second terminal of the series resonant inductor and a second terminal connected to a node between the first and second switches;

(f) a transformer comprising a secondary winding and a primary winding, said primary winding comprising a first terminal coupled to the second terminal of the series resonant inductor and a second terminal coupled to the second terminal of the parallel resonant inductor;

(g) a rectifier coupled to the secondary winding; and (h) control circuit means for generating first and second gate drive signals ($G_1$, $G_2$) for alternately driving the first and second switches such that an alternating current ($I_{LOAD}$) is provided to the primary winding of the transformer.

4. The series/parallel resonant converter recited in claim 3, further comprising zero current crossing means for detecting when a current ($I_R$) in the series resonant inductor is zero and controlling the generation of the first and second gate drive signals such that the first gate drive signal is set low when the current is zero and the second gate drive signal is set high following a controlled dead time delay ($\tau_D$) from the time the first gate drive signal was set low.

5. The series/parallel resonant converter recited in claim 4, wherein said first and second switches comprise members of the following group: IGBTs, BJTs, FETs, and MCTs.

* * * * *